(12) United States Patent  
Sakata et al.

(10) Patent No.: US 11,971,025 B2  
(45) Date of Patent: Apr. 30, 2024

(54) COMPRESSOR

(71) Applicant: Mitsubishi Electric Corporation, Tokyo (JP)

(72) Inventors: Kohei Sakata, Tokyo (JP); Shigeru Hata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 409 days.

(21) Appl. No.: 17/311,708

(22) PCT Filed: Feb. 26, 2019

(86) PCT No.: PCT/JP2019/007185  
§ 371 (c)(1),  
(2) Date: Jun. 8, 2021

(87) PCT Pub. No.: WO2020/174555  
PCT Pub. Date: Sep. 3, 2020

(65) Prior Publication Data  
US 2022/0025877 A1 Jan. 27, 2022

(51) Int. Cl.  
*F04B 39/12* (2006.01)  
*F04B 35/04* (2006.01)  
*F04B 49/10* (2006.01)

(52) U.S. Cl.  
CPC ............ *F04B 39/121* (2013.01); *F04B 35/04* (2013.01); *F04B 49/10* (2013.01); *F04B 2201/0801* (2013.01)

(58) Field of Classification Search  
CPC ........ F04B 39/121; F04B 35/04; F04B 49/10; F04B 2201/0801  
See application file for complete search history.

(56) References Cited

U.S. PATENT DOCUMENTS

| 6,755,631 B2 * | 6/2004 | Kawashima ....... H01R 13/5213 |
| | | 417/313 |
| 2008/0209925 A1 * | 9/2008 | Pham .................... F25B 49/022 |
| | | 62/126 |
| 2016/0017886 A1 * | 1/2016 | Milliff .................. F04C 23/008 |
| | | 417/410.5 |

FOREIGN PATENT DOCUMENTS

JP 2001-289170 A 10/2001  
JP 2002188570 A 7/2002  
(Continued)

OTHER PUBLICATIONS

English Translation of JP-2009197621-A obtained on Sep. 25, 2023 (Year: 2009).*

(Continued)

*Primary Examiner* — Connor J Tremarche  
(74) *Attorney, Agent, or Firm* — POSZ LAW GROUP, PLC (57) ABSTRACT

A compressor includes: a plurality of terminals; a terminal cover protecting the plurality of terminals; a temperature sensor configured to detect a temperature of a shell; and a cover having a flat portion disposed around the plurality of terminals, and a sensor protection portion covering the temperature sensor, the sensor protection portion being integrally formed with the flat portion to extend from the flat portion. The terminal cover is attached to cover the flat portion of the cover in a state in which the temperature sensor disposed on the shell is covered by the sensor protection portion of the cover. Thus, it is possible to prevent a lead wire of the temperature sensor from being accidentally cut when the terminal cover is attached.

7 Claims, 6 Drawing Sheets

(56) References Cited

FOREIGN PATENT DOCUMENTS

| | | | |
|---|---|---|---|
| JP | 2002188571 A | | 7/2002 |
| JP | 2009-097361 A | | 5/2009 |
| JP | 2009097361 A | * | 5/2009 |
| JP | 2009-197621 A | | 9/2009 |
| JP | 2009197621 A | * | 9/2009 |

OTHER PUBLICATIONS

English Translation of JP-2009097361-A obtained Jan. 17, 2024 (Year: 2009).*
International Search Report dated Jun. 4, 2019, issued in corresponding International Application No. PCT/JP2019/007185.
Office Action dated Dec. 22, 2023 issued in corresponding DE Patent Application No. 112019006923.3 (and English translation).

* cited by examiner

COMPRESSOR

CROSS REFERENCE TO RELATED APPLICATION

This application is a U.S. National Stage Application of International Application No. PCT/JP2019/007185, filed on Feb. 26, 2019, the contents of which are incorporated herein by reference.

TECHNICAL FIELD

The present disclosure relates to a compressor disposed in a refrigerant circuit.

BACKGROUND ART

A temperature sensor is disposed at a compressor disposed in a refrigerant circuit of, for example, an air-conditioning apparatus or a refrigerator to prevent an increase in the temperature of the compressor due to an overload operation or an operation in which refrigerant is leaking in the refrigerant circuit. For example, in a compressor described in Patent Literature 1, such a temperature sensor, a terminal, and a terminal protection cover that protects the terminal from, for example, dust or water are disposed on an outer surface of a shell of the compressor.

In the compressor, a sensor holding portion in which a space having a size equal to the external size of the temperature sensor and an opening space for leading sensor lead wires to one end of the space are formed at the terminal protection cover to extend from the terminal protection cover. The terminal protection cover covers the terminal and is attached to the outer surface of the shell of the compressor with the temperature sensor fitted into and temporarily fixed in the space of the sensor holding portion. Thus, the temperature sensor is closely fixed to the outer surface of the shell with the sensor holding portion. That is, in the compressor, the terminal protection cover protects, with the sensor holding portion, the temperature sensor from, for example, dust or water.

CITATION LIST

Patent Literature

Patent Literature 1: Japanese Unexamined Patent Application Publication No. 2002-188570

SUMMARY OF INVENTION

Technical Problem

However, in the compressor in Patent Literature 1, the terminal protection cover is attached to the outer surface of the shell of the compressor after the temperature sensor is fitted into the space of the sensor holding portion at the terminal protection cover. For this reason, lead wires of the temperature sensor may be accidentally cut.

The present disclosure is made to solve the above problem, and an object of the present disclosure is to provide a compressor capable of preventing a lead wire of a temperature sensor from being accidentally cut.

Solution to Problem

A compressor according to an embodiment of the present disclosure includes: a plurality of terminals; a terminal cover protecting the plurality of terminals; a temperature sensor configured to detect a temperature of a shell; and a cover having a flat portion disposed around the plurality of terminals, and a sensor protection portion covering the temperature sensor, the sensor protection portion being integrally formed with the flat portion to extend from the flat portion. The terminal cover is attached to cover the flat portion of the cover in a state in which the temperature sensor disposed on the shell is covered by the sensor protection portion of the cover.

Advantageous Effects of Invention

The compressor according to the embodiment of the present disclosure includes the cover. The cover is formed by integrally forming the flat portion disposed around the plurality of terminals with the sensor protection portion that protects the temperature sensor. The terminal cover is attached to cover the flat portion of the cover in a state in which the temperature sensor disposed on the shell is covered by the sensor protection portion of the cover. Thus, it is possible to prevent a lead wire of the temperature sensor from being accidentally cut when the terminal cover is attached.

DESCRIPTION OF EMBODIMENTS

Embodiment of the present disclosure will be described below with reference to the drawings. The forms of the components in the entire description are merely examples, and the forms of the components are not limited to those in the description. That is, modifications of the present disclosure can be made as appropriate without departing from the gist or the idea of the disclosure understandable from the claims and the entire description. Such modifications of a compressor are also included in the technical idea of the present disclosure. In addition, in the drawings, components having the same reference signs are the same or corresponding components, and this applies to the entire description.

Embodiment 1

<Configuration of Air-Conditioning Apparatus 1>

Figure 1:
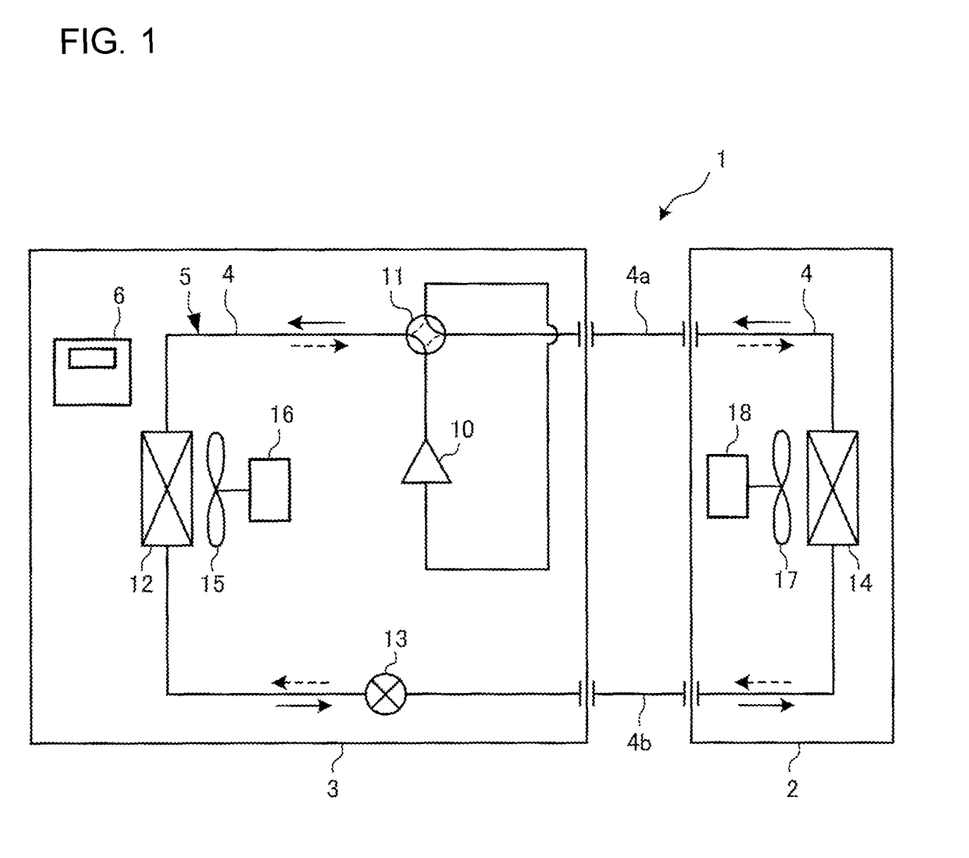
FIG. 1 is a schematic diagram illustrating a refrigerant circuit of an air-conditioning apparatus according to Embodiment 1 of the present disclosure.

An air-conditioning apparatus 1 according to Embodiment 1 of the present disclosure will be described with reference to FIG. 1. FIG. 1 is a schematic diagram illustrating a refrigerant circuit 5 of the air-conditioning apparatus 1 according to Embodiment 1 of the present disclosure.

As illustrated in FIG. 1, the air-conditioning apparatus 1 according to Embodiment 1 performs cooling or heating to condition indoor air by transferring heat between outdoor air and indoor air via refrigerant. The air-conditioning apparatus 1 includes an indoor unit 2 and an outdoor unit 3.

In the air-conditioning apparatus 1, the indoor unit 2 and the outdoor unit 3 are connected via refrigerant pipes 4, which are disposed inside the indoor unit 2 and the outdoor unit 3, and refrigerant pipes 4a and 4b, which are disposed outside the indoor unit 2 and the outdoor unit 3, to form the refrigerant circuit 5, in which refrigerant circulates. A compressor 10, a flow switching device 11, an outdoor heat exchanger 12, an expansion valve 13, and an indoor heat exchanger 14 are disposed in the refrigerant circuit 5 and are connected via the refrigerant pipes 4, 4a, and 4b.

The outdoor unit 3 includes the compressor 10, the flow switching device 11, the outdoor heat exchanger 12, and the expansion valve 13. The compressor 10 compresses and discharges suctioned refrigerant. The compressor 10 may be driven and controlled by an inverter. In this case, the capacity of the compressor 10 can be varied by varying operating frequency with a control unit 6. The capacity of the compressor 10 is the amount of refrigerant sent by the compressor 10 per unit time. The flow switching device 11 is, for example, a four-way valve and is a device that switches refrigerant flow directions.

The air-conditioning apparatus 1 is capable of achieving a heating operation or a cooling operation by switching refrigerant flows with the flow switching device 11 on the basis of instructions from the control unit 6. The outdoor heat exchanger 12 exchanges heat between refrigerant and outdoor air. An outdoor fan 15 for improving the efficiency of heat exchange between refrigerant and outdoor air is disposed at the outdoor heat exchanger 12 to face the outdoor heat exchanger 12. The outdoor fan 15 may be driven and controlled by an inverter. In this case, the operating frequency of a fan motor 16, which is a drive source of the outdoor fan 15, is varied by the inverter to vary the rotation speed of the outdoor fan 15. The outdoor fan 15 may be, for example, a sirocco fan or a plug fan as long as a similar effect is achieved. In addition, the outdoor fan 15 may be a forced draft fan or an induced draft fan.

The outdoor heat exchanger 12 functions as an evaporator in the heating operation and exchanges heat between outdoor air and refrigerant that has a low pressure and that has flowed thereinto from the refrigerant pipe 4b to evaporate and gasify the refrigerant. The refrigerant then flows out toward the refrigerant pipe 4a. In addition, the outdoor heat exchanger 12 functions as a condenser in the cooling operation and exchanges heat between outdoor air and refrigerant that has been compressed in the compressor 10 and that has flowed thereinto from the refrigerant pipe 4a via the flow switching device 11 to condense and liquify the refrigerant. The refrigerant then flows out toward the refrigerant pipe 4b. The case in which outdoor air is used as an external fluid has been described here as an example. However, the external fluid is not limited to gas including outdoor air and may be liquid including water.

The expansion valve 13 is an expansion device that controls the flow rate of refrigerant. Refrigerant pressure is adjusted by controlling the flow rate of refrigerant flowing in the refrigerant pipes 4 by varying the opening degree of the expansion valve 13. In the cooling operation, the expansion valve 13 expands and decompresses liquid refrigerant having a high pressure into two-phase gas-liquid refrigerant having a low pressure. The expansion valve 13 may be, for example, an electronic expansion valve or a capillary tube as long as a similar effect is achieved. For example, when the expansion valve 13 is formed by an electronic expansion valve, the opening degree is adjusted on the basis of instructions from the control unit 6.

The indoor unit 2 includes the indoor heat exchanger 14, which exchanges heat between refrigerant and indoor air, and an indoor fan 17, which adjusts the flow of air to be subjected to heat exchange in the indoor heat exchanger 14.

The indoor heat exchanger 14 functions as a condenser in the heating operation and exchanges heat between indoor air and refrigerant that has flowed thereinto from the refrigerant pipe 4a to condense and liquify the refrigerant. The refrigerant then flows out toward the refrigerant pipe 4b. In addition, the indoor heat exchanger 14 functions as an evaporator in the cooling operation and exchanges heat between indoor air and refrigerant that has been decompressed by the expansion valve 13 and that has flowed thereinto from the refrigerant pipe 4b to transfer heat from the air to the refrigerant and thus evaporate and gasify the refrigerant. The refrigerant then flows out toward the refrigerant pipe 4a. The case in which indoor air is used as an external fluid has been described here as an example. However, the external fluid is not limited to gas including indoor air and may be liquid including water.

The operation speed of the indoor fan 17 is determined by a user setting. The indoor fan 17 is preferably driven and controlled by an inverter. In this case, the operating frequency of a fan motor 18 is varied by the inverter to vary the rotation speed of the indoor fan 17. The indoor fan 17 may be, for example, a sirocco fan or a plug fan as long as a similar effect is achieved. In addition, the indoor fan 17 may be a forced draft fan or an induced draft fan.

<Examples of Cooling and Heating Operations of Air-Conditioning Apparatus 1>

Next, the cooling operation is described as an operation example of the air-conditioning apparatus 1. Gas refrigerant that has a high temperature and a high pressure and that has been compressed and discharged by the compressor 10 flows into the outdoor heat exchanger 12 via the flow switching device 11. The gas refrigerant that has flowed into the outdoor heat exchanger 12 condenses into refrigerant having a low temperature by being subjected to heat exchange with outdoor air sent by the outdoor fan 15, and the refrigerant flows out from the outdoor heat exchanger 12. The refrigerant that has flowed out from the outdoor heat exchanger 12 is expanded and decompressed, by the expansion valve 13, into two-phase gas-liquid refrigerant having a low temperature and a low pressure. The two-phase gas-liquid refrigerant flows into the indoor heat exchanger 14 of the indoor unit 2 and evaporates into gas refrigerant having a low temperature and a low pressure by being subjected to heat exchange with indoor air sent by the indoor fan 17, and the gas refrigerant flows out from the indoor heat exchanger 14. In this case, the indoor air cooled by the refrigerant receiving heat therefrom becomes conditioned air (blowing air), and the conditioned air blows from the indoor unit 2 into an indoor space that is an air-conditioned space. The gas refrigerant that has flowed out from the indoor heat exchanger 14 is suctioned into the compressor 10 via the flow switching device 11 and is compressed again. In the cooling operation of the air-conditioning apparatus 1, the above steps represented by solid arrows in FIG. 1 are repeated.

Next, the heating operation is described as an operation example of the air-conditioning apparatus 1. Gas refrigerant that has a high temperature and a high pressure and that has been compressed and discharged by the compressor 10 flows into the indoor heat exchanger 14 of the indoor unit 2 via the flow switching device 11. The gas refrigerant that has flowed into the indoor heat exchanger 14 condenses into refrigerant having a low temperature by being subjected to heat exchange with indoor air sent by the indoor fan 17, and the refrigerant flows out from the indoor heat exchanger 14. In this case, the indoor air heated by receiving heat from the gas refrigerant becomes conditioned air (blowing air), and the conditioned air blows from the indoor unit 2 into an indoor space. The refrigerant that has flowed out from the indoor heat exchanger 14 is expanded and decompressed, by the expansion valve 13, into two-phase gas-liquid refrigerant having a low temperature and a low pressure. The two-phase gas-liquid refrigerant flows into the outdoor heat exchanger 12 of the outdoor unit 3 and evaporates into gas refrigerant having a low temperature and a low pressure by being subjected to heat exchange with outdoor air sent by the outdoor fan 15, and the gas refrigerant flows out from the outdoor heat exchanger 12. The gas refrigerant that has flowed out from the outdoor heat exchanger 12 is suctioned into the compressor 10 via the flow switching device 11 and is compressed again. In the heating operation of the air-conditioning apparatus 1, the above steps represented by dashed arrows in FIG. 1 are repeated.

<Configuration of Outdoor Unit 3>

Figure 2:
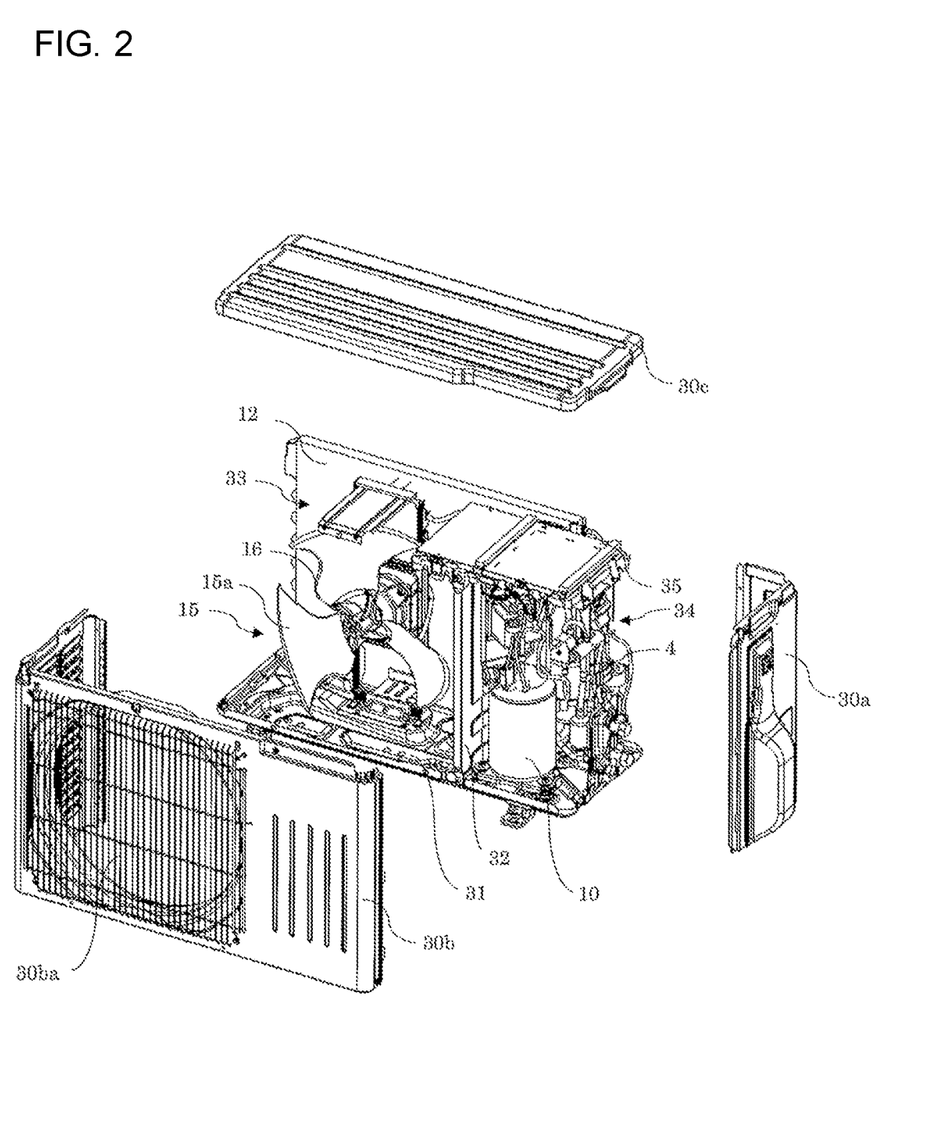
FIG. 2 is a perspective view illustrating the configuration of an outdoor unit in the air-conditioning apparatus in FIG. 1.

The outdoor unit 3 of the air-conditioning apparatus 1 according to Embodiment 1 will be described with reference to FIG. 2. FIG. 2 is a perspective view illustrating the configuration of the outdoor unit 3 in the air-conditioning apparatus 1 in FIG. 1.

As illustrated in FIG. 2, the outdoor unit 3 includes a side panel 30a, a front panel 30b, a top panel 30c, and a bottom plate 31, which form a housing that covers the contours thereof. The side panel 30a covers one side of the outdoor unit 3. The front panel 30b covers the front and the other side opposite to the side panel 30a of the outdoor unit 3. The top panel 30c covers the top of the outdoor unit 3. The bottom plate 31 covers the bottom of the outdoor unit 3. The housing is formed into a cuboid shape as a whole. The housing of the outdoor unit 3 may include a back panel (not illustrated) that is disposed at the back of the housing and that covers the outdoor heat exchanger 12.

The inside of the housing of the outdoor unit 3 is partitioned into an air passage compartment 33 and a machine compartment 34 by a partition plate 32. The outdoor fan 15 is installed at the front of the housing in the air passage compartment 33. The outdoor heat exchanger 12 is installed at the back of the outdoor fan 15 in the air passage compartment 33.

The outdoor fan 15 includes a plurality of blades 15a and is rotated and driven by the fan motor 16. An air outlet 30ba having a slit-like shape for discharging the air inside the housing to the outside of the housing is disposed at the front panel 30b, which is positioned at the front of the outdoor fan 15 in the housing of the outdoor unit 3. The outdoor heat exchanger 12 has a structure including heat transfer tubes through which refrigerant flows and fins for increasing the area for heat transfer between refrigerant flowing in each heat transfer tube and outside air. Detailed illustration of the structure is omitted.

The compressor 10, which is connected to the outdoor heat exchanger 12 via the refrigerant pipes 4 and supplies refrigerant to the outdoor heat exchanger 12, is installed in the machine compartment 34. In addition, a current sensor configured to detect the operation of the outdoor unit 3 and electrical components 35 such as a power module and an inverter board are installed in the machine compartment 34.

<Configuration of Compressor 10>

Figure 3:
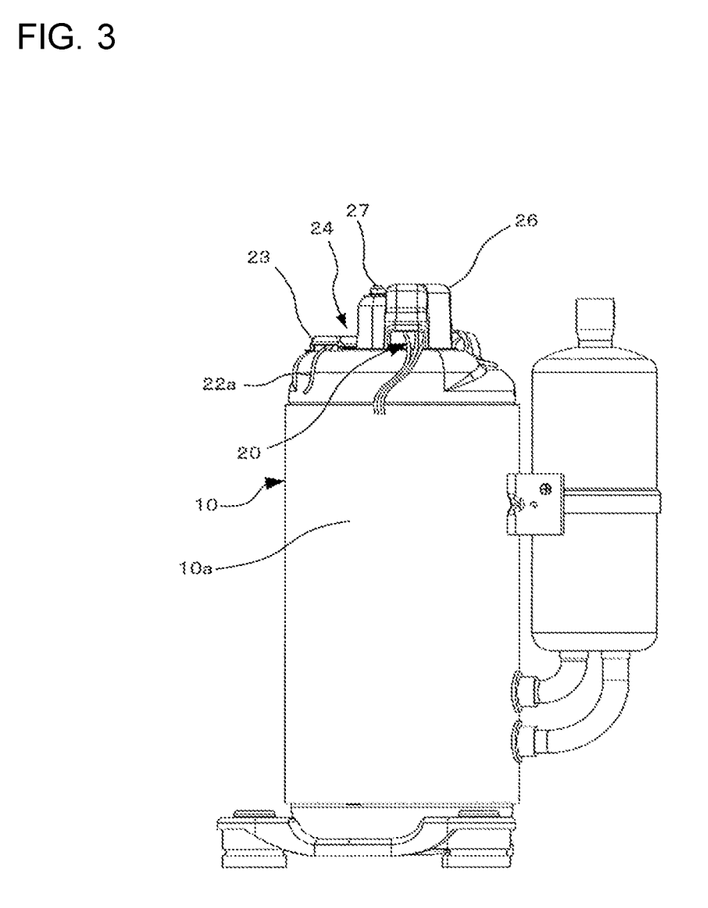
FIG. 3 is an enlarged front view of a compressor in FIG. 2.
Figure 4:
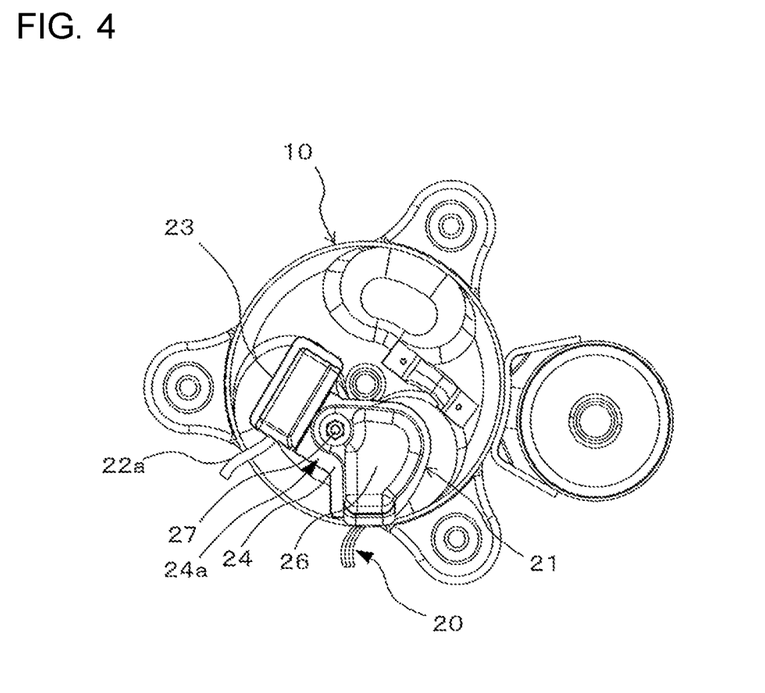
FIG. 4 is a top view of the compressor in FIG. 3.
Figure 5:
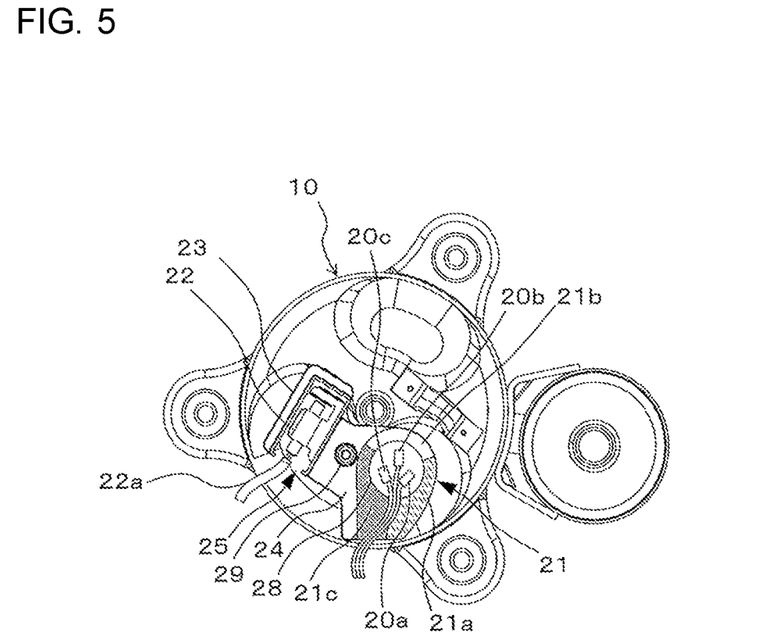
FIG. 5 is an exploded sectional top view of a part of the compressor in FIG. 4.
Figure 6:
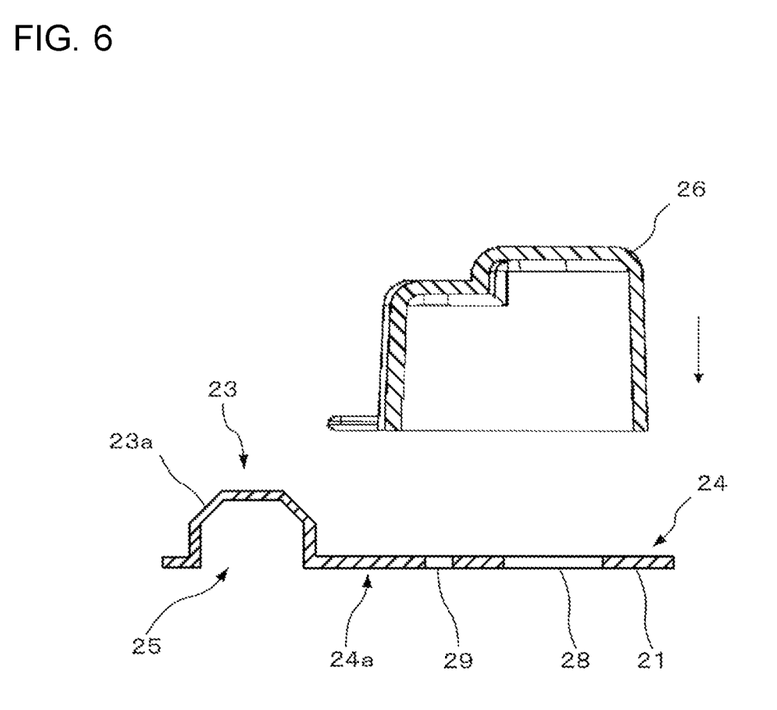
FIG. 6 is an exploded sectional view illustrating a cover and a terminal cover in the compressor in FIG. 3.
Figure 7:
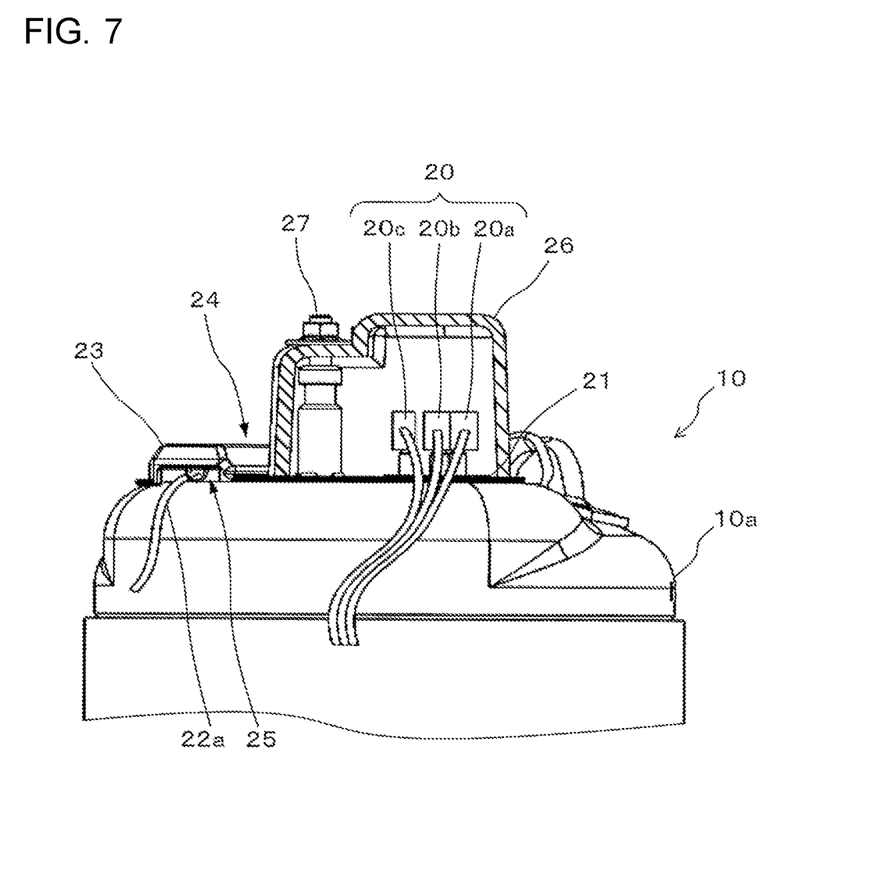
FIG. 7 is an enlarged partial sectional view of the top of the compressor in FIG. 3.

Next, the compressor 10 disposed in the outdoor unit 3 according to Embodiment 1 will be described with reference to FIGS. 3 to 7. FIG. 3 is an enlarged front view of the compressor 10 in FIG. 2. FIG. 4 is a top view of the compressor 10 in FIG. 3. FIG. 5 is an exploded sectional top view of a part of the compressor 10 in FIG. 4. FIG. 6 is an exploded sectional view illustrating a cover 24 and a terminal cover 26 in the compressor 10 in FIG. 3. FIG. 7 is an enlarged partial sectional view of the top of the compressor 10 in FIG. 3. For convenience, a plurality of terminals 20a, 20b, and 20c are described below by being collectively illustrated as terminals 20.

As illustrated in FIGS. 3 to 7, the compressor 10 includes the plurality of terminals 20a, 20b, and 20c, the terminal cover 26, which protects the terminals 20, and a temperature sensor 22, which is configured to detect the temperature of a shell 10a. The temperature sensor 22 is disposed to prevent an increase in the temperature of the compressor 10 due to an overload operation or an operation in which refrigerant is leaking in the refrigerant circuit 5 of the air-conditioning apparatus 1 in FIG. 1 described above.

In Embodiment 1, the compressor 10 includes the cover 24. The cover 24 has a flat portion 21, which is disposed around the plurality of terminals 20a, 20b, and 20c, and a sensor protection portion 23, which protects the temperature sensor 22.

As illustrated in FIG. 5, areas 21a, 21b, and 21c, whose positions depend on the corresponding positions of the plurality of terminals 20a, 20b, and 20c, are partitioned off and formed at the flat portion 21 to be distinguished by, for example, colors or patterns at the respective positions where the terminals 20 are installed. Thus, it is possible to easily perform positioning of the flat portion 21 when the flat portion 21 is disposed on the shell 10a of the compressor 10 (see FIG. 3).

As illustrated in FIGS. 4 to 7, a first opening 28, through which the plurality of terminals 20a, 20b, and 20c pass, and a second opening 29, through which a terminal cover fixing portion 27 passes, are formed in the flat portion 21. The terminal cover 26 is fixed with the terminal cover fixing portion 27. Thus, as described below, when the terminal cover 26 is fixed to the shell 10a with the terminal cover fixing portion 27, the cover 24 is not rotated or shifted in a horizontal direction by passing the terminal cover fixing portion 27 through the second opening 29.

As illustrated in FIG. 6, the sensor protection portion 23 is integrally formed with the flat portion 21 to extend from the flat portion 21. The sensor protection portion 23 is shaped into a box that covers and that is not in contact with the temperature sensor 22 and the vicinity of the temperature sensor 22. In addition, the sensor protection portion 23 is shaped to be open toward the top of the compressor 10. In other words, the sensor protection portion 23 in a state of being attached to the compressor 10 is shaped into a box whose bottom is open. In addition, as illustrated in FIG. 5, an opening 25 for leading a lead wire 22a of the temperature sensor 22 is formed at a side of the sensor protection portion 23 shaped into a box, that is, in Embodiment 1, at a part of a side of the sensor protection portion 23 in the short-side direction.

As illustrated in FIGS. 4 and 5, after the temperature sensor 22 is disposed at the top of the compressor 10, the cover 24 formed as described above is disposed at the top of the compressor 10 such that the temperature sensor 22 is covered by the sensor protection portion 23. In this case, when the sensor protection portion 23 covers the temperature sensor 22, the cover 24 is disposed in a state in which the lead wire 22a of the temperature sensor 22 is led from the opening 25. Thus, the lead wire 22a is not accidentally cut.

The sensor protection portion 23 is shaped into a box that covers and that is not in contact with the temperature sensor 22 and the vicinity of the temperature sensor 22. Thus, even when the temperature sensor 22 is formed with a different shape or size, the temperature sensor 22 can be flexibly fitted to the cover 24. That is, the position or the size of the sensor protection portion 23 of the cover 24 does not have to be changed especially for each temperature sensor 22 having a different shape or size. In other words, the cover 24 in Embodiment 1 has excellent versatility. In addition, the cover 24 performs, with the sensor protection portion 23, a functions of preventing water droplets that drip from above the compressor 10 in the refrigerant circuit 5 (see FIG. 1) from intruding into the temperature sensor 22 (see FIG. 5).

As illustrated in FIGS. 3, 4, 6, and 7, the cover 24, together with the terminal cover 26, is fixed to the top of the compressor 10 by attaching the terminal cover 26 with the terminal cover fixing portion 27. More specifically, the terminal cover 26 is disposed on the cover 24 to cover the plurality of terminals 20a, 20b, and 20c together with the flat portion 21 and is fixed to the top of the shell 10a of the compressor 10 with the terminal cover fixing portion 27. In this case, as illustrated in FIGS. 4 and 6, a part of the terminal cover 26 is positioned on a connecting region 24a between the flat portion 21 and the sensor protection portion 23 of the cover 24. As described above, when the terminal cover 26 is attached, the cover 24 has been already disposed at the top of the shell 10a with the temperature sensor 22 covered by the sensor protection portion 23 of the cover 24. Thus, when the terminal cover 26 is attached, the lead wire 22a of the temperature sensor 22 is not accidentally cut with the terminal cover 26.

<Effects of Embodiment 1>

As described above, the compressor 10 in Embodiment 1 includes the cover 24. The cover 24 is formed by integrally forming the flat portion 21, which is disposed around the plurality of terminals 20a, 20b, and 20c, with the sensor protection portion 23, which protects the temperature sensor 22. After the temperature sensor 22 is disposed at the top of the compressor 10, the cover 24 is disposed at the top of the compressor 10 such that the temperature sensor 22 is covered by the sensor protection portion 23 in a state in which the lead wire 22a of the temperature sensor 22 is led from the opening 25. Thus, it is possible to prevent the lead wire 22a of the temperature sensor 22 from being accidentally cut when the cover 24 is attached to the compressor 10. Subsequently, the terminal cover 26 is disposed on the cover 24 to cover the plurality of terminals 20a, 20b, and 20c together with the flat portion 21 and is fixed to the top of the shell 10a of the compressor 10 with the terminal cover fixing portion 27. Accordingly, when the terminal cover 26 is attached, the cover 24 has been already disposed at the top of the shell 10a with the temperature sensor 22 covered by the sensor protection portion 23 of the cover 24. Thus, it is possible to reliably prevent the lead wire 22a of the temperature sensor 22 from being accidentally cut when the terminal cover 26 is attached to the compressor 10. In this manner, the compressor 10 is capable of preventing the lead wire 22a of the temperature sensor 22 from being accidentally cut.

In this case, the sensor protection portion 23 of the cover 24 is shaped into a box that covers and that is not in contact with the temperature sensor 22 and the vicinity of the temperature sensor 22. Thus, the same cover 24 can be used even for temperature sensors 22 having different shapes or sizes.

In addition, in the compressor 10 in Embodiment 1, a part of the terminal cover 26 covering the terminals 20 is configured to be positioned on the connecting region 24a between the flat portion 21 and the temperature sensor 22. In this case, the terminal cover fixing portion 27 for fixing the terminal cover 26 is disposed in the terminal cover 26. Thus, the cover 24, together with the terminal cover 26, can be fixed to the top of the compressor 10 by holding down the terminal cover 26 to the top of the compressor 10 with the terminal cover fixing portion 27. Accordingly, an additional fixing component with which the cover 24 is fixed to the compressor 10 does not have to be disposed.

In addition, the first opening 28, through which the terminals 20 pass, and the second opening 29, through which the terminal cover fixing portion 27 passes, are disposed in the flat portion 21. When the terminal cover 26 is fixed to the top of the shell 10a with the terminal cover fixing portion 27 with the cover 24 interposed therebetween, the terminal cover fixing portion 27 passes through the second opening 29. Thus, it is possible to prevent the cover 24 from being rotated or shifted in a horizontal direction.

In addition, the areas 21a, 21b, and 21c, whose positions depend on the corresponding positions of the plurality of terminals 20a, 20b, and 20c, are partitioned off and formed at the flat portion 21 to be distinguished by, for example, colors or patterns at the respective positions where the terminals 20 are installed. Thus, it is possible to easily perform positioning of the flat portion 21 when the flat portion 21 is disposed on the shell 10a of the compressor 10.

REFERENCE SIGNS LIST

1: air-conditioning apparatus, 2: indoor unit, 3: outdoor unit, 4, 4a, 4b: refrigerant pipe, 5: refrigerant circuit, 6: control unit, 10: compressor, 10a: shell, 11: flow switching device, 12: outdoor heat exchanger, 13: expansion valve, 14: indoor heat exchanger, 15: outdoor fan, 15a: blade, 16: fan motor, 17: indoor fan, 18: fan motor, 20: terminal, 21: flat portion, 21a, 21b, 21c: area, 22: temperature sensor, 22a: lead wire, 23: sensor protection portion, 23a: covering portion, 24: cover, 24a: connecting region, 25: opening, 26: terminal cover, 27: terminal cover fixing portion, 28: first opening, 29: second opening, 30a: side panel, 30b: front panel, 30ba: air outlet, 30c: top panel, 31: bottom plate

The invention claimed is:

1. A compressor comprising:
a plurality of terminals;
a terminal cover protecting the plurality of terminals;
a temperature sensor configured to detect a temperature of a shell; and
a cover having
a flat portion disposed around the plurality of terminals, and
a sensor protection portion covering the temperature sensor, the sensor protection portion being integrally formed with the flat portion to extend from the flat portion,
wherein the terminal cover is attached to cover the flat portion of the cover in a state in which the temperature sensor disposed on the shell is covered by the sensor protection portion of the cover,
wherein
the sensor protection portion covers the temperature sensor and does not contact the temperature sensor.

2. The compressor of claim 1 wherein the sensor protection portion is provided outside the terminal cover, and a part of the terminal cover is positioned on a connecting region between the flat portion and the sensor protection portion of the cover.

3. The compressor of claim 1 wherein a first opening through which the plurality of terminals pass and a second opening through which a terminal cover fixing portion passes are formed in the flat portion, the terminal cover being fixed with the terminal cover fixing portion, and the sensor protection portion is provided outside the terminal cover.

4. The compressor of claim 1 wherein the flat portion is partitioned into areas whose positions depend on corresponding positions of the plurality of terminals, and the sensor protection portion is provided outside the terminal cover.

5. The compressor of claim 3, wherein
the terminal cover fixing portion passes through a hole in the terminal cover.

6. The compressor of claim 4, wherein
the areas are distinguished by colors or patterns.

7. The compressor of claim 1, wherein
the sensor protection portion is provided outside the terminal cover.

* * * * *